United States Patent [19]
Krinsky et al.

[11] Patent Number: 5,208,485
[45] Date of Patent: May 4, 1993

[54] APPARATUS FOR CONTROLLING CURRENT THROUGH A PLURALITY OF RESISTIVE LOADS

[75] Inventors: Jeffrey A. Krinsky, Renton; Tim R. Majoch, Puyallup, both of Wash.

[73] Assignee: The Boeing Company, Seattle, Wash.

[21] Appl. No.: 781,963

[22] Filed: Oct. 24, 1991

[51] Int. Cl.$^5$ .............................................. H02J 3/00
[52] U.S. Cl. ...................................... 307/41; 307/34; 307/39; 307/53; 323/267
[58] Field of Search .................... 323/267; 307/34, 35, 307/36, 38, 41, 30, 39, 40, 52, 53

[56] References Cited

U.S. PATENT DOCUMENTS

| | | | |
|---|---|---|---|
| 3,629,548 | 12/1971 | Rygiol | 219/131 R |
| 3,675,114 | 7/1972 | Nercessian | 323/9 |
| 3,731,181 | 5/1973 | Cecil et al. | 323/4 |
| 3,943,431 | 3/1976 | Hareyama | 323/1 |
| 3,984,699 | 10/1976 | Bailey | 307/41 |
| 4,461,690 | 7/1984 | Rolff et al. | 204/228 |
| 4,536,716 | 8/1985 | Yoshida et al. | 330/69 |
| 4,642,473 | 2/1987 | Bryant | 307/38 |
| 4,729,086 | 3/1988 | Lethellier | 363/65 |
| 4,775,842 | 10/1988 | Rumreich | 330/103 |

OTHER PUBLICATIONS

K. R. Stafford et al., "A Monolithic Radiation-Hardened Operational Amplifier," Solid State Technology, vol. 13, No. 5, pp. 67-72, May 1970.

J. A. Goretzki et al., "Regulator Current Share Circuit," IBM Technical Disclosure Bulletin, vol. 21, No. 4, p. 1610, Sep. 1978.

Primary Examiner—Steven L. Stephan
Assistant Examiner—Adolf Berhane
Attorney, Agent, or Firm—Christensen, O'Connor, Johnson & Kindness

[57] ABSTRACT

Disclosed is an electrical control circuit (10) for controlling current through a plurality of resistive loads (14(1), 14(2) ... 14(N)). The control circuit includes a plurality of current control stages (12(1), 12(2), ... 12(N)), a comparator circuit (18), and a plurality of diodes $D_1$, $D_2$ ... $D_{N-1}$ in serial connection with the current control stages. The comparator circuit controls the current that is drawn collectively through the loads. The diodes ensure that all preceding current control stages in the series are conducting a predetermined level of current before the next current control stage begins to source current through its respective load. Each current control stage includes an operational amplifier (30), a pass transistor (34), a sense resistor ($R_s$), and a feedback resistor ($R_f$). The operational amplifiers are a pre-drive to the pass transistors to allow smaller sense resistors to be used, thereby providing greater efficiency. The feedback resistors ($R_f$) provide feedback to the operational amplifiers.

21 Claims, 6 Drawing Sheets

APPARATUS FOR CONTROLLING CURRENT THROUGH A PLURALITY OF RESISTIVE LOADS

FIELD OF THE INVENTION

The present invention relates to the regulation of power in general, and more particularly, to a method and apparatus for providing current protection and control to a plurality of branches in a circuit.

BACKGROUND OF THE INVENTION

Many electrical applications require current or power dissipation beyond the ratings of a single transistor. In these applications, two or more transistors, called pass transistors, are often connected in parallel to meet the current or power requirements of the circuit. Common applications in which pass transistors are used included power switching and power regulation.

To operate effectively, the pass transistors must share current equally to prevent problems of thermal runaway. Thermal runaway is a condition where one of a group of parallel-connected pass transistors begins to heat up, thereby lowering the base-emitter voltage drop ($V_{BE}$) and increasing the gain ($h_{fe}$) of the transistor. In turn, the fluctuation of $V_{BE}$ and $h_{fe}$ further increases the current flow through the transistor, creating additional heat that has a further effect on these parameters. Eventually, the current flow through the transistor may exceed the ratings of the transistor, causing failure. Merely connecting the pass transistors in a parallel configuration will not provide equal current sharing, because of the inherent characteristics of the transistors. In particular, the bipolar transistors used as pass transistors typically have a wide variation in the base-emitter voltage drops and different gain values.

A common method to ensure equal current sharing is to use current sense resistors, i.e., emitter resistors, to provide degenerative feedback, thereby masking the individual differences of the transistors. The voltage drop across the emitter resistors can also be monitored to prevent an over-current condition through the pass transistors. To work effectively, the resistors chosen should have a voltage drop at maximum current which is at least as large as the base-to-emitter voltage of the pass transistors, typically several tenths of a volt. The power lost in the current-sense resistors is typically not available for a useful purpose, and the power available to the load is therefore reduced. In addition, this extra power dissipation usually increases the complexity, cost, and size of the electrical system. More recently, operational amplifiers have been utilized to drive the pass transistors, allowing lower resistances to be used for the sense resistors.

The disadvantages associated with typical methods of providing current sharing become increasingly important when high efficiency is required at near-full load of the system, e.g., when the power being dissipated by the load approaches the limits of the total power available to the system. There is a continuing need for techniques for providing current control and over-current protection without dissipating significant amounts of power for this purpose.

SUMMARY OF THE INVENTION

The present invention provides an electrical control circuit for controlling current in a linear fashion through a plurality of loads, e.g., a multi-element load, using a single control line. The control circuit includes a number of current control stages, each of which is connected to a separate one of the loads. Current is conducted by the current control stages in a sequential fashion, with each preceding stage being forced to conduct a predetermined level of current before a subsequent stage will turn on. The sequential activation of the loads provides an efficient control mechanism whereby linear current control is maintained in a very efficient manner, i.e., the minimum number of current control stages (and hence loads) are on at any given level of current called for through the control line.

The control circuit comprises a plurality of current control stages arranged in a sequence and an activation circuit. Each current control stage includes first, second, and third terminals. Current is conducted between the first and second terminals in response to a level signal present at the third terminal of each current control stage. Each current control stage is operable in response to its level signal in a first state in which it conducts a relatively low level of current, in a second state in which it conducts a predetermined level of current, and in one or more intermediate states in which it conducts levels of current between the first and second states. The activation circuit is coupled to the third terminals of each current control stage and produces the level signals in response to a control signal present on the single control line such that when one of the current control stages is conducting current in an intermediate state, all preceding current control stages in the sequence are in their second states and all subsequent current control stages are in their first states.

In one aspect of the invention current control stages are substantially non-conducting when in their first states and are fully conducting when in their second states. The intermediate states of each current control stage form a continuum in which the amount of current conducted varies linearly as its respective level signal rises.

In another aspect of the invention, the activation circuit includes a comparator circuit and a plurality of blocking circuits. The comparator circuit is responsive to the control signal and a feedback signal and generates an output signal that is coupled to the third terminal of the first current control stage in the sequence. A different one of the blocking circuits is positioned between the third terminals of pairs of the current control stages. Each blocking circuit has a substantially nonconducting state and a conducting state, with any particular blocking circuit being in a conducting state only when all preceding current control stages are conducting current at their respective second states. The control signal is a function of the desired level of current conducted by the current control stages and the feedback signal is indicative of the actual level of current being conducted by the current control stages. Thus, the output is a function of the voltage differential between the control and feedback signals.

In a further aspect of the invention the electrical control circuit includes a minimum circuit coupled between the single control line and the activation circuit to establish a maximum level of current to be conducted through the current control stages. Minimum circuits may also be coupled between the activation circuit and each of the current control stages to establish a maximum level of of current to be conducted individually by each current control stage.

BRIEF DESCRIPTION OF THE DRAWINGS

The various features and advantages of the invention will be understood in view of the following description taken in conjunction with the accompanying drawings in which.

DETAILED DESCRIPTION OF THE PREFERRED EMBODIMENT

Figure 1:
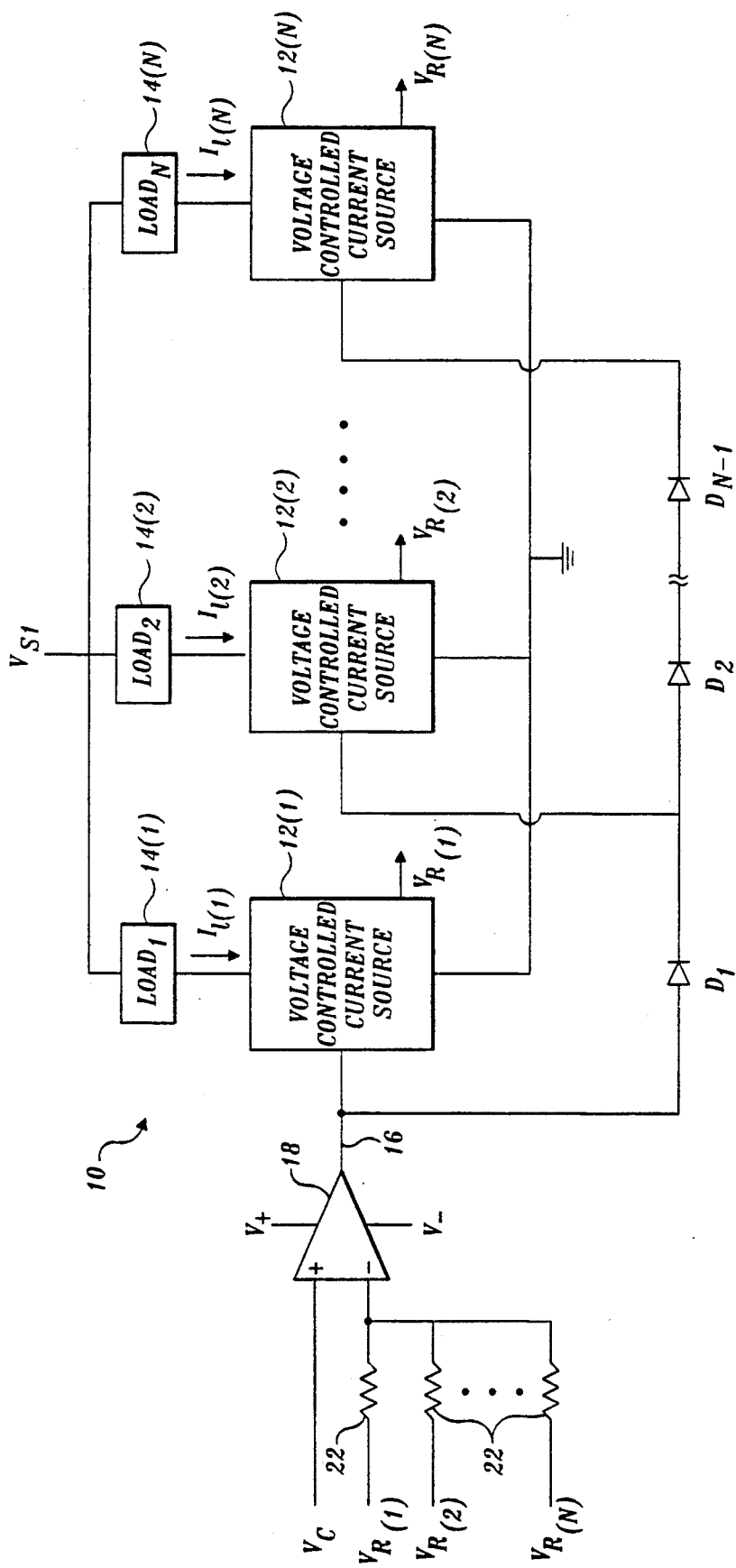
FIG. 1 is a block diagram of a first preferred embodiment of a control circuit in accordance with the invention.

With reference to FIG. 1, a control circuit 10 in accordance with the invention includes a plurality of voltage-controlled current sources 12(1), 12(2), . . . 12(N) that are coupled in parallel between a plurality of loads 14(1), 14(2), . . . 14(N) and ground (or any other reference potential). The loads 14 are connected to a voltage source $V_{S1}$. The current sources 12 draw current from $V_{S1}$ through the loads in response to an output signal on line 16 generated by a comparator circuit 18. A plurality of diodes $D_1$, $D_2$, . . . $D_{N-1}$ are serially coupled between the signal on line 16 and the current sources 12(2), 12(3), . . . 12(N) to provide sequential activation of the current sources.

The current being drawn through the loads at any given time is designated as $I_{l(1)}$, $I_{l(2)}$, . . . $I_{l(N)}$, respectively, as is shown near the upper portion of FIG. 1. A plurality of reference voltages $V_{R(1)}$, $V_{R(2)}$, . . . $V_{R(N)}$ are produced by the current flowing through the current sources 12(1), 12(2), . . . 12(N), respectively, each reference voltage being proportional to or a function of the current through the respective voltage source. The reference voltages $V_R$ are coupled to the comparator circuit 18, to provide feedback indicating the level of current being conducted collectively by the current sources 12.

The comparator circuit 18 is preferably an operational amplifier having its inverting input connected to each of the reference voltages $V_R$ through a plurality of resistors 22. The inverting input of the comparator circuit 18 is a summing node for the reference voltages $V_R$. Preferably, the resistors 22 have approximately equivalent resistive values. Thus, the voltage potential at the inverting input of the comparator circuit 18 is the average of the reference voltages $V_R$. The utilization of non-equal resistances for the resistors 22 would provide a weighted average of the reference voltages $V_R$.

A control voltage $V_C$ is connected to the noninverting input of the comparator circuit 18. The control voltage $V_C$ is generated by a control system (not shown) and is indicative of the desired level of current through the current sources 12. The output of the comparator circuit 18 is connected to line 16 to provide the output signal for controlling the current sources. Thus, the value of the signal on line 16 will be that voltage required to equalize the inverting and noninverting inputs of comparator circuit 18.

With regard to the connection of the diodes $D_1-D_N$, each current source 12 includes an input terminal that is electrically coupled to the output terminal of the comparator circuit 18. Each current source 12 responds to a level signal applied to its respective input terminal through line 16. The input terminal of the first current source (12(1)) is directly connected to the output terminal of comparator circuit 18 through line 16. The input terminal of the second current source (12(2)) is connected to the output terminal of comparator circuit 18 through the first diode ($D_1$). The input terminal of third current source (12(3)) is connected to the output terminal of comparator circuit 18 through the first and second diodes ($D_1$ and $D_2$), and so on, with the current source 12(N) being connected to the output terminal through diodes $D_1-D_{N-1}$.

Each of the current sources 12(N) include a number of operable states in which the current source conducts varying levels of current through its respective load. The current sources include a first state in which a relatively low level of current is being conducted, a second state in which a predetermined level of current is being conducted, and one or more intermediate states in which the level of current conducted is between the first and second states. The output of the comparator circuit is such that when one of the current sources is conducting current in an intermediate state, all preceding current sources in the sequence are in their second states and all subsequent current sources in the sequence are in their first states.

The diodes $D_N$ work in conjunction with the comparator circuit 18 and other components in control circuit 10 to ensure that all the preceding current sources are conducting at their second state before activating the next current source in the circuit. The output of any given current source 12 will increase linearly until reaching a fully conducting state, as defined by the internal components of the current source, the voltage source, and its respective load. Thereafter, the next current source 12 in the series will begin to conduct as the output of comparator circuit 18 is further increased in response to control voltage $V_C$.

The sequential activation of the loads provides an efficient control mechanism whereby linear current control is maintained in a very efficient manner. It will be appreciated that a greater percent of the current being conducted by the current sources will be dissipated by the load, as opposed to by the internal components of the current source, as the current source approaches its second state. For example, a half driven load may dissipate on the order of one-half the power generated by the current flowing through the load whereas the percentage approaches 100% when the load is being fully driven. Thus, it is generally most efficient to provide a series of current control stages (current sources) where only a single stage is in an intermediate state, with the other stages in the series being either in their second states, e.g., fully conducting, or conducting a relatively low level of current, e.g., substantially non-conducting.

FIGS. 2A-2E depict the voltage-current (V-I) characteristics of the control circuit 10 at various nodes on the control circuit. For illustrative purposes, it is assumed that the control voltage $V_C$ is steadily increasing. Each of the dashed vertical lines in FIGS. 2A-2E represents, from left to right, where a current source begins to conduct current through its respective load. The first two vertical lines from the origin (24 and 26) are labeled to aid in this discussion. In the area between the origin and the first dashed vertical line 24, the first current source (12(1) of FIG. 1) is conducting current in its intermediate state; between the first and second dashed vertical lines 24 and 26, the first and second current sources (12(1) and 12(2)) are conducting current; after line 26, the first three current sources (12(1), 12(2) and 12(3)) are conducting, and so on.

Figure 2A:
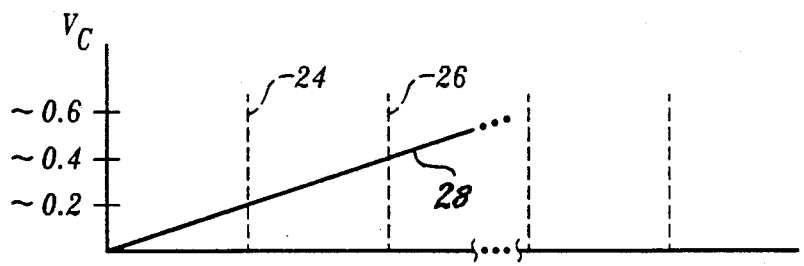
FIGS. 2A-2E illustrate the operation of the control circuit of FIG. 1.

FIG. 2A represents the control voltage $V_C$ applied to the noninverting input of comparator circuit 18. As $V_C$ increases above zero volts, comparator circuit 18 produces a voltage output on line 16 that causes current source 12(1) to begin conducting current. Moreover, because of diode $D_1$, the voltage produced by the operational amplifier does not reach the other current sources. Once current source 12(1) begins conducting current, it produces a feedback voltage $V_{R(1)}$ at the inverting input of the comparator circuit. The inverting input of comparator circuit 18 will track the control voltage present at the noninverting input. Thus, as the control voltage $V_C$ is increased, the comparator circuit will equalize its inverting and noninverting outputs, creating a higher voltage potential at the comparator circuit output, thereby causing increased current flow through the current source 12(1).

The current through current source 12(1) will rise monotonically as the control voltage is increased, until the level of current through the current source is at a predetermined level, i.e., at its second state. The second state is associated with a given control voltage $V_C$, here assumed to be on the order of 0.2 volts. This current level corresponds to vertical line 24 in FIGS. 2A-2E. When the control voltage reaches the above-described voltage level, an additional current source begins to conduct current through its respective load. A third current source will begin to conduct when $V_C$ rises above twice the voltage level (approximately 0.4 volts), as indicated by vertical line 26. As is shown by line 28, the summation of current through the loads remains linear as control voltages are applied to the comparator circuit and current sources turn on and off in response to the control voltage.

Figure 2B:
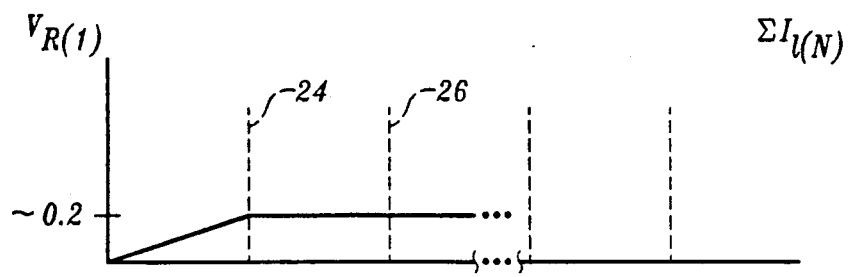
Figure 2C:
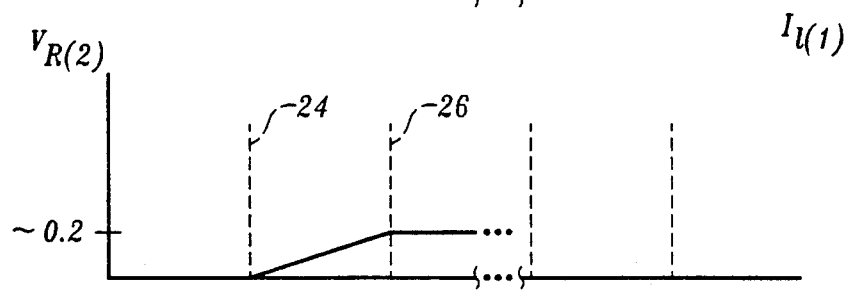
Figure 2D:
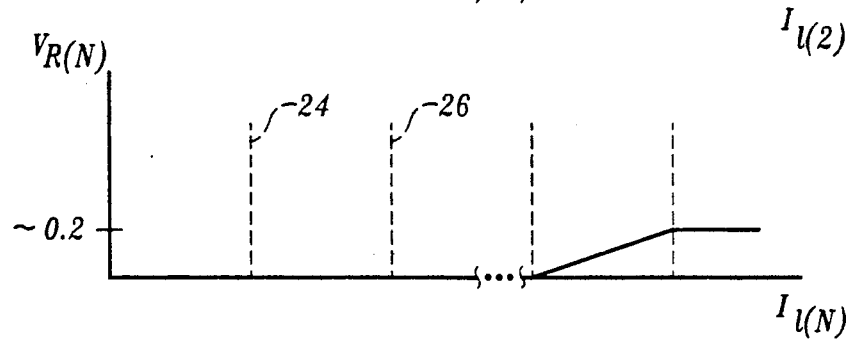

FIGS. 2B, 2C and 2D depict the operation of a first, second and Nth current source, respectively. As is described above, each current source will conduct current linearly to a predetermined current level. Once the predetermined current level is reached, a subsequent current source in the series begins to conduct. In FIG. 2B, the first current source conducts current to the predetermined level, i.e., when $V_{R(1)}$ reaches approximately 0.2 volts at line 24, whereby the second current source begins to conduct current as shown in FIG. 2C. FIG. 2D illustrates the Nth current source beginning to conduct current. The predetermined current level to be conducted by a single current source is limited by the internal components within the current source. Design considerations used in determining this predetermined current level include, for example, the ratings of the loads being coupled to the current sources, the ratings of the components comprising the current sources, and the limitations of the power source $V_{S1}$.

Figure 2E:
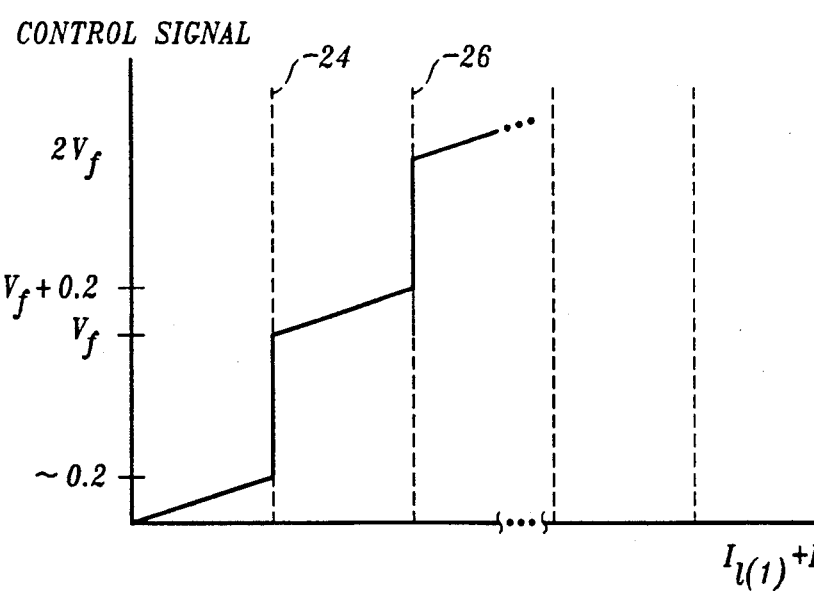

FIG. 2E illustrates the relationship between the summation of currents $I_{l(N)}$ sourced by the control circuit and the output signal appearing on line 16 from the comparator circuit 18 of FIG. 1. The following discussion makes reference to both FIG. 1 and FIG. 2E. With reference to the portion of FIG. 2E between the origin and line 24, the output voltage signal from comparator circuit 18 tracks the control voltage $V_C$ of FIG. 2A until reaching the predetermined current level to be sourced by a single current source (at line 24). As the control voltage $V_C$ is increased just above the potential needed to require current source 12(1) to be in its second state, e.g., just above 0.2 volts, current source 12(2) must begin to conduct. However, current source 12(2) will not receive an input signal until the forward voltage drop $V_f$ across the first diode $D_1$ is reached. To provide this forward voltage potential, the comparator circuit 18, in comparing the control voltage $V_C$ to the average of the reference voltages $V_R$, will find that the control voltage is slightly higher than the average of the reference voltages, and will increase its output. As the output of the comparator circuit 18 is increased, the diode $D_1$ will become forward biased, turning on the current source 12(2). This progression is indicated at line 24. As current beyond twice the predetermined level is required, the output signal on line 16 will again rise sharply (shown at line 26) to supply the requisite voltage, i.e., to twice the value of the forward voltage drop of $D_1$.

As will be appreciated, the above-described events occur within very short time intervals. The voltage needed (at the output of comparator circuit 18) to turn on a subsequent current source will depend on the type of diodes used in serial connection with the current sources. It is noted that devices other than diodes, such as batteries or transistors, may be used as substitutes for the diodes disclosed in FIG. 1.

The control circuit provides an efficient method and apparatus for controlling current linearly to a multi-element load. Further, linear control is accomplished utilizing a single control line. The control of several loads directly, for example, through a computer using multiple control lines, is not as advantageous because the use of separate controls increases the cost and complexity of the control circuit.

Figures 3, 4:
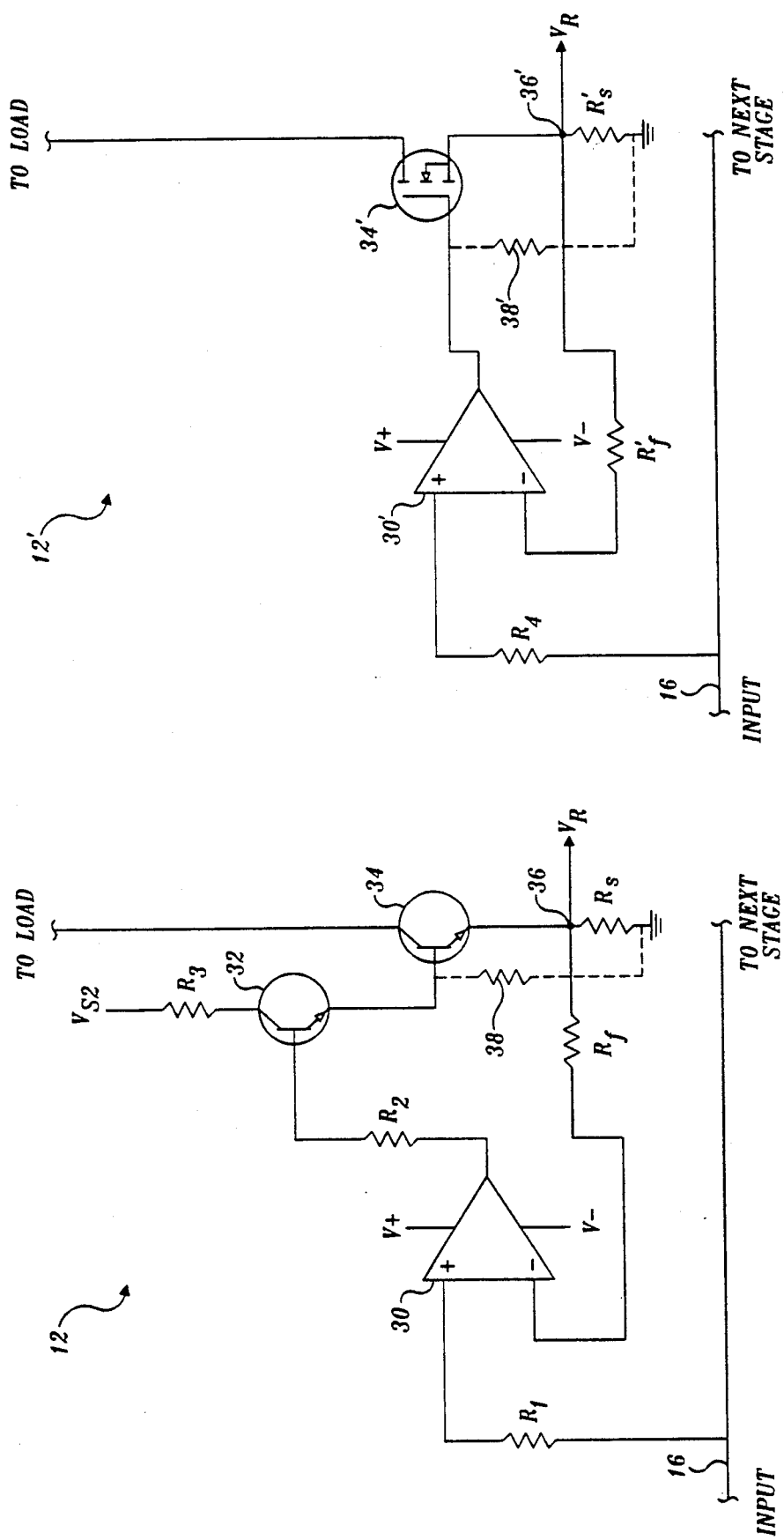
FIG. 3 is a circuit diagram of a first preferred embodiment of a voltage-controlled current source representative of the voltage-controlled current sources shown in block form in FIG. 1.
FIG. 4 is a circuit diagram of a second preferred embodiment of a voltage-controlled current source representative of the voltage-controlled current sources shown in block form in FIG. 1.

FIG. 3 illustrates a first preferred embodiment of a current source (12) representative of one of the voltage-controlled current sources 12(1), 12(2), . . . 12(N) depicted in block form in FIG. 1. Current source 12 includes an operational amplifier 30, a drive transistor 32, a pass transistor 34 and a sense resistor $R_s$. The noninverting input of the operational amplifier 30 is coupled to the output of the comparator circuit via line 16, preferably through a resistor $R_1$. The inverting input of the operational amplifier 30 is connected to a feedback resistor $R_f$ which in turn is connected to a node 36 located between the emitter of the pass transistor 34 and the sense resistor $R_s$. The output of operational amplifier 30 is connected to the base or control terminal of drive transistor 32 through a resistor $R_2$. The resistor $R_2$ limits the total current drive to the drive transistor 32 when the operational amplifier 30 is fully on.

The collector or input terminal of the drive transistor 32 is coupled to a voltage source $V_{S2}$, preferably through a resistor $R_3$. Resistor $R_3$ limits the current drawn by the drive transistor 32 to minimize power dissipation and to prevent thermal runaway of transistor 32. A suitable operating voltage for voltage source $V_{S2}$ is on the order of 5 volts (with reference to ground), which is commonly available in many systems. A voltage source separate from voltage source $V_{S1}$ is shown because the drive transistor 32 typically will not require the power capacities of $V_{S1}$. Thus, the use of a separate voltage supply minimizes the total power dissipated by the control system 10. However, drive transistor 32 can be connected to voltage source $V_{S1}$ or another voltage source. Further, it may be beneficial in some applications to connect the transistors 32 and 34 as a Darlington pair, although this connection is generally less efficient than the disclosed embodiment of FIG. 3.

The emitter or output terminal of drive transistor 32 is connected to the base (control terminal) of pass transistor 34. The drive transistor 32 provides a current gain $h_{fe}$ to drive the pass transistor 34. It is noted that additional drive transistors may be required to drive the pass transistor 34. The need for additional drive transistors is dependent, in part, upon the drive requirement of the pass transistor 34. The collector (input terminal) of pass transistor 34 is connected to the respective load of the current source. Further, the emitter of the pass transistor 34 is connected to the sense resistor $R_s$ at node 36. The sense resistor $R_s$ is connected between node 36 and ground. The reference voltage $V_R$ is the voltage across the sense resistor $R_s$. Although the physical connections are not shown in FIG. 1, the inverting input of the comparator circuit 18 is connected to the nodes 36 of each current source 12 through one of the resistors 22, thereby providing the reference voltage $V_R$ to the comparator circuit.

In the operation of current source 12, an output signal proportional to the desired current through the loads is generated by the comparator circuit, and applied to the noninverting terminal of the operational amplifier 30 via line 16. Assuming all preceding current sources 12 are in their second states, the output signal is amplified by the operational amplifier 30, turning on the drive transistor 32. Collector-emitter current begins to flow through transistor 32, turning on the pass transistor 34. The collector-emitter current from the pass transistor 34 flows through the feedback resistor $R_f$ and sense resistor $R_s$ providing a voltage signal to the inverting input of the operational amplifier 30. Upon equalization of the noninverting and inverting inputs of the operational amplifier 30, current through the sense resistor $R_s$ is maintained at a constant value until a new input is generated by the comparator circuit on line 16.

With reference to FIG. 1, a value indicative of the current flowing through the loads 14 can, in general, be sensed at the loads. As an example, each load 14 may be a separate element or coil inside a furnace with the control circuit 10 being a temperature controller. A thermocouple mechanically connected to the furnace coils provides feedback to the comparator circuit 18 via the control voltage $V_C$. Loads 14 are turned on and off, and the current through individual loads is increased and decreased, in response to the thermocouple output and a desired furnace temperature.

Alternatively, a value indicative of the current flowing through the loads may be sensed by sensing the sum of the current through each of the sense resistors of each current source 12(1), 12(2), ... 12(N). Sensing the current through the sense resistors is useful in fault-monitoring applications. It is noted that the sum of the current through the sense resistors of each current source 12 will be slightly greater than the sum of the current through the loads 14. This is due to base-to-emitter drive current ($I_{be}$) of the pass transistors flowing through the sense resistors but not the loads 14.

With reference again to FIG. 3, the current flow through a particular load for any given signal generated by the comparator circuit will depend, in part, upon the value of the sense resistors $R_s$. This is because the operational amplifier 30, ideally, will have little or no voltage drop across feedback resistor $R_f$. In the preferred embodiment, all of the sense resistors $R_s$ are of the same resistance. Thus, each current source draws the same level of current when they are in their second states.

The inherent characteristics of the individual pass transistors 34 do not affect the current flow through the branches (current sources 12) of the control circuit because the operational amplifier 30 of each current source 12 limits the level of current that may be sourced therethrough. Further, the use of an operational amplifier as a pre-drive to the drive and pass transistors 32 and 34 allows relatively small resistances to be used for the sense resistors $R_s$, thereby reducing the power consumption in these resistors and the circuit as a whole. The minimum resistance of the sense resistors $R_s$, however, is limited by the characteristics of the particular operational amplifier used for the operational amplifier 30. As the value of the sense resistors is decreased, the voltage drop across these resistors will approach the offset voltage of the operational amplifier; and, as these values approach one another, the likelihood of error in the circuit is increased.

As is known to those skilled in the art, the leakage current $I_{CB}$ (through the collector and base) of a transistor increases with increasing temperature. At higher temperatures, $I_{CB}$ current may inadvertently turn the pass transistor 34 on or may prevent the transistor from turning off if previously on. An optional shunt resistor 38 placed between the base of pass transistor 34 and ground (i.e., to the end of sense resistor $R_s$ opposite node 36) will provide a shunt path for $I_{CB}$ current and thus ensure that the pass transistor does not turn on or inadvertently remain on as a consequence of the collector-base leakage current.

FIG. 4 illustrates a second preferred embodiment of a current source (12') representative of one of the voltage-controlled current sources 12(1), 12(2), ... 12(N) depicted in block form in FIG. 1. Current source 12' includes an operational amplifier 30', a field-effect pass transistor 34', a sense resistor $R'_s$ and a feedback resistor $R'_f$. The pass transistor 34' replaces the drive and pass transistors 32 and 34 of the current source 12 depicted in FIG. 3.

Pass transistor 34' includes a control terminal (gate), an input terminal (drain), and an output terminal (source). The circuit connections of the circuit depicted in FIG. 4 are similar to those of FIG. 3. The noninverting input of the operational amplifier 30' is coupled to the output of the comparator circuit via line 16, preferably through a resistor $R_4$. The inverting input of the operational amplifier 30' is connected to the feedback resistor $R'_f$. The output of the operational amplifier 30' is connected to the gate of the pass transistor 34'. The source of the pass transistor 34' is connected to the feedback resistor $R'_f$. The sense resistor $R'_s$ is connected between the source of the pass transistor 34' and ground at node 36'. The drain of the pass transistor 34' is connected to the respective load of the current source 12'.

As in FIG. 3, the inverting input of the comparator circuit 18 of FIG. 1 is connected to the current source 12' at node 36'. The reference voltage $V_R$ is the voltage drop across sense resistor $R'_s$. An optional shunt resistor 38' may be used to ensure shut-off of the pass transistor 34'. The shunt resistor 38' is connected between the gate of the pass transistor 34' and ground.

Current source 12' functions in a manner similar to the current source 12 of FIG. 3. The use of field-effect transistors is advantageous in some applications because they are highly efficient and can typically be driven from the output of an operational amplifier, without requiring a drive transistor. It is noted, however, that a second field-effect transistor can be used as a drive transistor (with connections similar to the drive transistor 32) to reduce the time delay in which the current sources 12' react to inputs from the comparator circuit. A further advantage of using field effect transistors over the bipolar embodiment is that the current through the sense resistors $R'_s$ will more closely approximate the current through the load. Also, field effect transistors do not require current when in a steady state, i.e., when current through the pass transistor 34' remains constant.

In contrast to using field-effect transistors, the use of bipolar transistors as the drive and pass transistors 32 and 34 (of FIG. 3) is advantageous in some radiation environments (e.g., space or other heavy ion environments). Under some operating conditions, field-effect transistors are prone to burnout due to single event upset (SEU). Bipolar power transistors are not prone to SEU-induced burnout.

Figure 5:
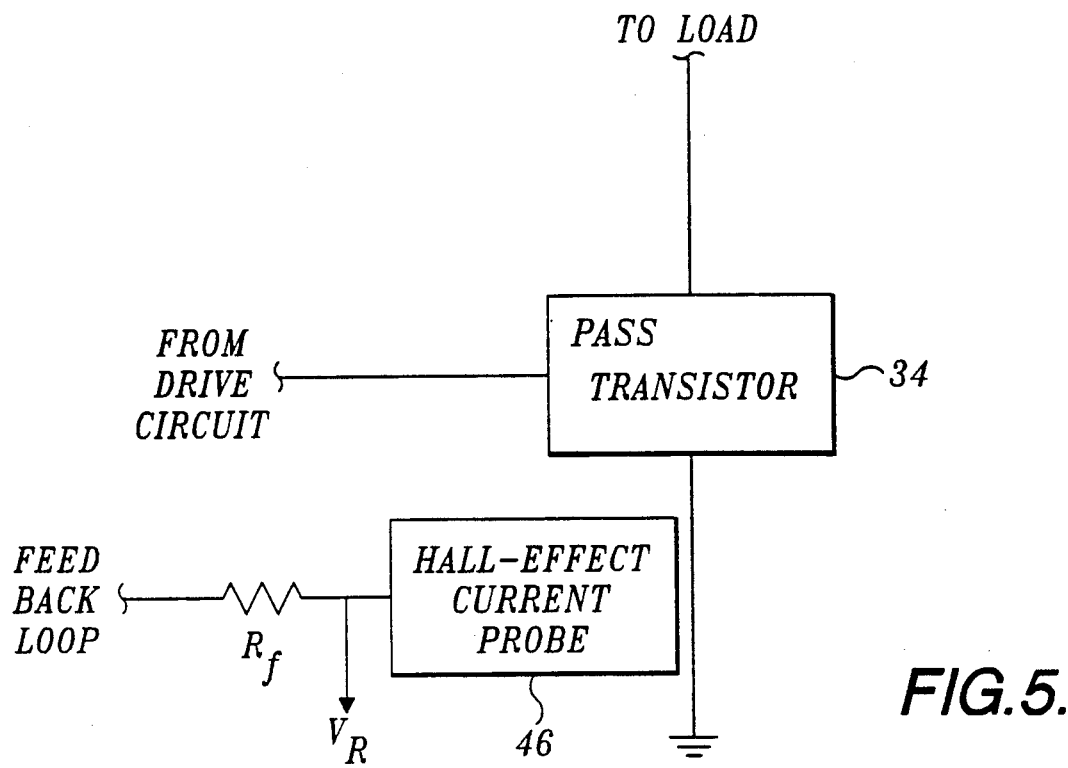
FIG. 5 is a circuit diagram illustrating the use of a non-resistive current probe as an alternative to the sense resistors implemented in the voltage-controlled current sources of FIGS. 3 and 4.

FIG. 5 illustrates an alternative embodiment of the current source 12 of FIG. 3, where the sense resistor $R_s$ is moved and the output terminal (emitter) of the pass transistor 34 is connected to ground. Current through the pass transistor 34 is monitored by a Hall-effect current probe 46. The current probe 46 is placed in close proximity to the pass transistor-ground connection, thereby allowing the sensing of current therethrough. The output terminal of the current probe 46 is connected to the feedback resistor $R_f$. The output of the current probe 46 also provides the reference voltage $V_R$ to the comparator circuit. The current probe 46 provides a non-resistive means of sensing current through the pass transistors in the control circuit to provide current sharing. Other non-resistive methods of current sensing may also be implemented.

Figure 6:
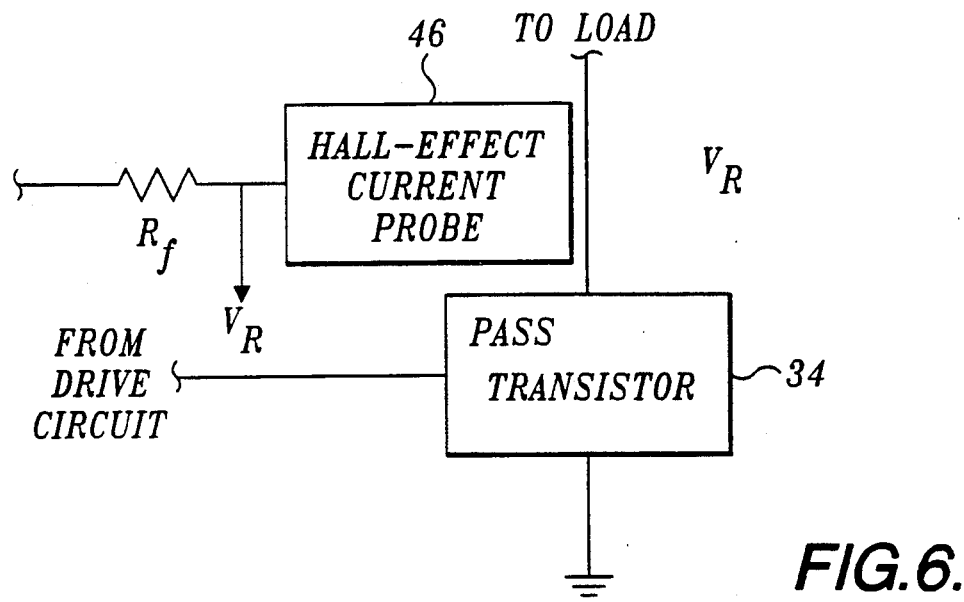
FIG. 6 is a circuit diagram illustrating an alternative embodiment of the circuit diagram of FIG. 5.

With reference to FIG. 6, in a second alternative embodiment, the current probe 46 of FIG. 5 is placed between the input terminal (collector) of the pass transistor 34 and the load. The operation of current probe 46 of FIG. 6 is the same as that of FIG. 5. However, it is noted that the current through the pass transistor 34 is sensed in FIG. 5 while the current through the load itself is sensed in FIG. 6. It is further noted that the embodiment of FIGS. 5 and 6 may also be implemented in the current source 12' of FIG. 4. The electrical connections in this embodiment are the same as those shown in FIGS. 5 and 6.

Figure 7:
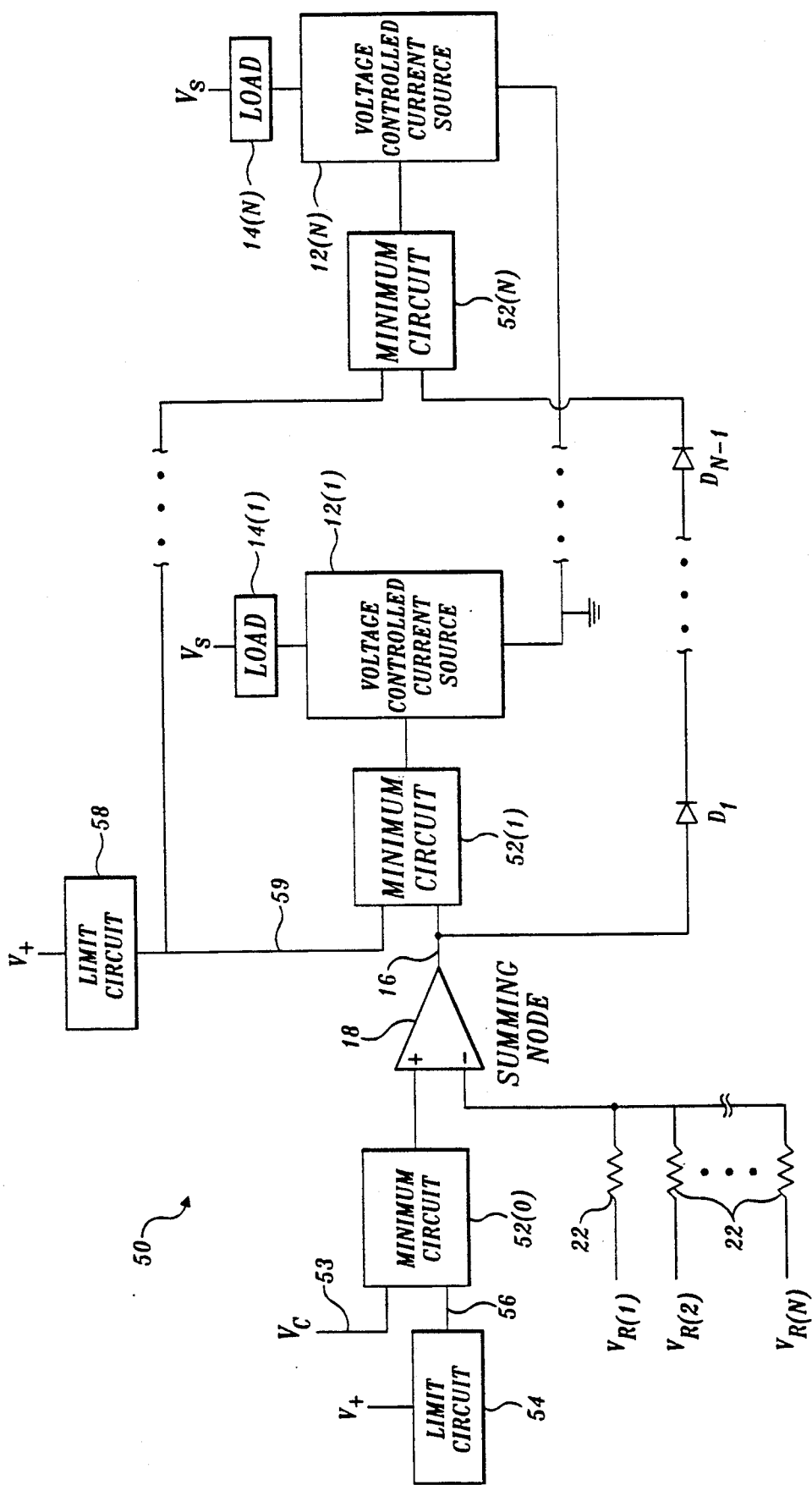
FIG. 7 is a block diagram of a second preferred embodiment of a control system in accordance with the invention.

FIG. 7 illustrates a second preferred embodiment of a control circuit 50 in accordance with the invention. Control circuit 50 provides over-current protection through the addition of a plurality of minimum circuits 52(0), 52(1), . . . 52(N) to the control circuit 10. Each minimum circuit provides an output signal equal to the minimum of two input signals. Corresponding circuit elements referenced in each of the control circuits 10 and 50 are identically labeled.

The minimum circuit 52(O) limits the control voltage $V_C$ (which is indicative of the desired level of current to be sourced through the current sources 12) to a maximum voltage level, and thus establishes a maximum current level that can be collectively drawn by the current sources 12 in the control circuit 50. The remaining minimum circuits 52(1), . . . 52(N) establish a maximum level of current that a particular current source 12 can conduct, i.e., minimum circuit 52(1) limits the current that can be conducted by current source 12(1), intermediate minimum circuits (not shown) limit the current conducted through their respective current sources, and minimum circuit 52(N) limits the current to be conducted through current source 12(N).

The minimum circuit 52(O) is coupled between a control system (not shown) that generates the control voltage $V_C$ (on line 53) and the comparator circuit 18. The control system can be, for example, a computer that compares the desired and actual levels of current flowing through the loads and produces an output signal ($V_C$) to indicate whether more or less current should be sourced by the control circuit 50. The minimum circuit 52(0) is also coupled to a limit circuit 54 on line 56 that generates a limit signal that is a function of the maximum current level to be drawn collectively by all of the current sources 12. The output of the minimum circuit 52(0) is connected to the noninverting input of the comparator circuit 18 of the comparator circuit 18.

The minimum circuits 52(1)–52(N) provide the minimum of two voltage signal inputs to the current sources 12. The first input of each minimum circuit 52 is coupled to the output of comparator circuit 18 (on line 16). The first input to minimum circuit 52(1) is directly connected to line 16. The first inputs of the remaining minimum circuits 52 are connected to line 16 through one or more of the diodes $D_1$-$D_{N-1}$. The second input to each minimum circuit 52 is coupled to a limit circuit 58 (on line 59) that establishes the maximum level of current that can be individually drawn through each current source 12. The output terminals of the minimum circuits 52(1)–52(N) are coupled to the input terminals of the current sources 12(1)–12(N), respectively.

Figure 8:
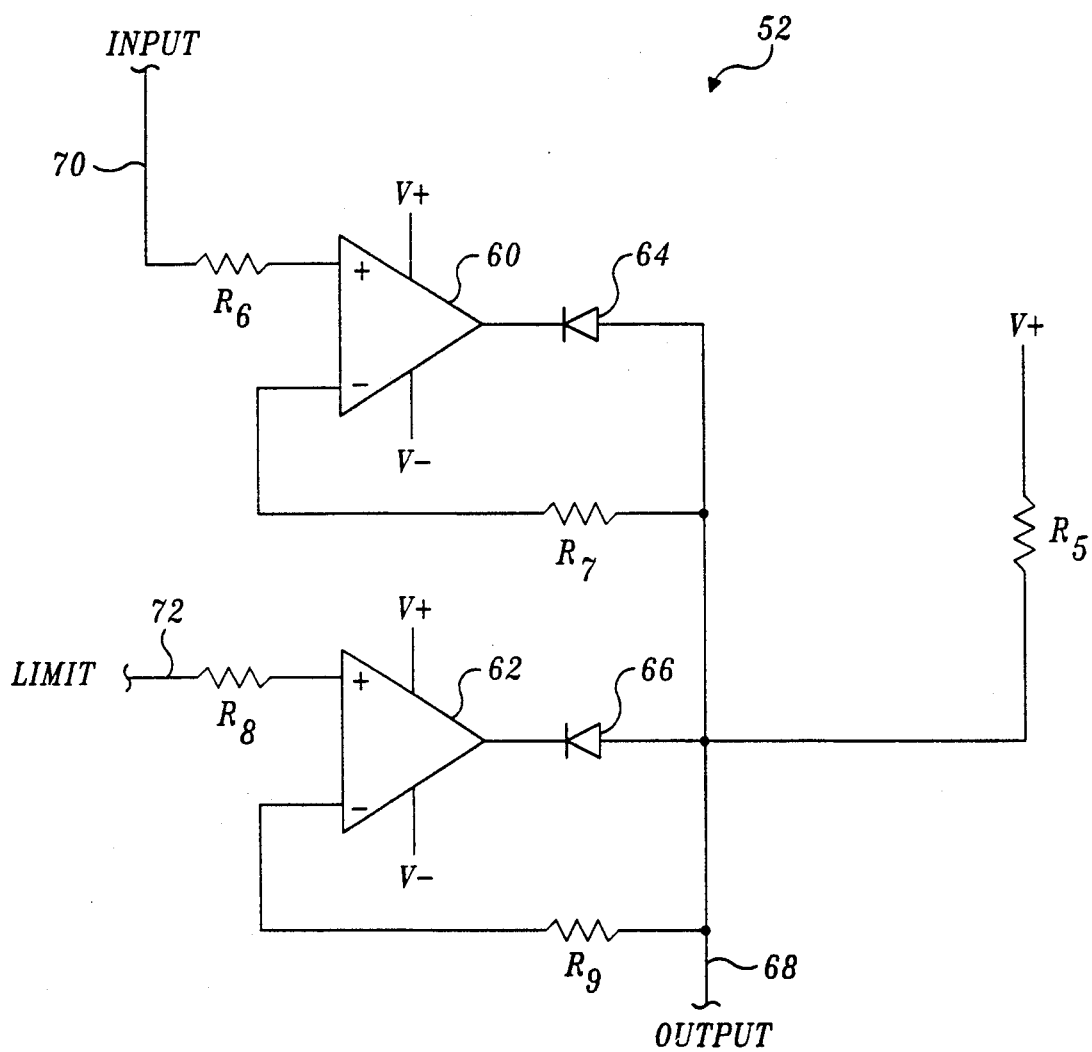
FIG. 8 is a circuit diagram of a preferred embodiment of the minimum circuit shown in block form in FIG. 7.

With reference to FIG. 8, each minimum circuit 52 includes an operational amplifier 60, an operational amplifier 62 and a pair of diodes 64 and 66. The cathodes of the diodes 64 and 66 are connected to the output terminals of the operational amplifiers 60 and 62, respectively. The anodes of the diodes 64 and 66 are commonly connected to an output line 68, which is also connected to a power supply $V_+$ through a resistor $R_5$. A suitable voltage level for $V_+$ is on the order of 5 volts.

Operational amplifier 60 receives an input to its noninverting terminal via an input line 70, preferably through a resistor $R_6$. For minimum circuit 52(0), input line 70 is connected directly to a control system to receive the control voltage $V_C$ (line 53 of FIG. 7). For minimum circuit 52(1), input line 70 is connected directly to the output terminal of the comparator circuit 18. Input line 70 of minimum circuit 52(N) is also coupled to the output terminal of the comparator circuit 18, but in series with the diodes $D_1$-$D_{-1}$.

The inverting terminal of operational amplifier 60 is connected to output line 68 through a feedback resistor $R_7$. The operational amplifier 60 draws current from the voltage supply $V_+$ to equalize the voltage potential appearing at its noninverting and inverting inputs. Thus, without taking into account the effect of operational amplifier 62, a voltage signal applied to the noninverting input will be present at the inverting input terminal and on line 68.

Operational amplifier 62 operates in the same manner as operational amplifier 60. The operational amplifier 62 receives an input to its noninverting terminal via an input line 72, preferably through a resistor $R_8$. The signal on input line 72 is generated by a limit circuit (i.e., limit circuits 54 and 58 of FIG. 7) to establish the maximum voltage potential that can be applied to the current sources. Operational amplifier 62 includes a feedback resistor $R_9$ connected between line 68 and its inverting input terminal. The operational amplifier 62 will also work to equalize the voltage appearing at its noninverting and inverting inputs, and thus, will attempt to place the voltage appearing at its noninverting input on line 68.

The operational amplifiers 60 and 62 operate in combination such that the voltage level appearing on line 68 will be the minimum of the potentials appearing on input lines 70 and 72. The operational amplifier having the lowest input signal will draw sufficient current from $V_+$ (across $R_5$) to bring the value of output line 68 to that potential. The operational amplifier having the higher input potential will attempt to equalize its noninverting and inverting inputs by reducing current through resistor $R_5$, but will fail to do so, since the diode connected to the operational amplifier with the higher input signal will become reversed biased and turn off, thereby blocking the output of that operational amplifier. The (higher input) operational amplifier will continue to attempt to equalize its inputs until the voltage appearing at its output is approximately equal to the output of voltage source $V_+$ (e.g., approximately 5 volts). Thereafter, the diode connected to the (higher input) operational amplifier will remain off until the input to this amplifier becomes approximately equal to or falls below the input to the (lower input) operational amplifier.

With regard to minimum circuit 52(0), the operational amplifier 62 will have its noninverting input set to a predetermined voltage level corresponding to the maximum current to be drawn collectively through all of the loads. The operational amplifier 60 will fluctuate in response to the output of the control system (i.e., control voltage $V_C$). Thus, it will be appreciated from the foregoing discussion that the voltage appearing on output line 68 will track the output of the control system (via the operational amplifier 60) to a predetermined maximum (i.e., the input to the operational amplifier 62). Once this predetermined maximum value is reached, output line 68 will be held to this potential despite any efforts by the control system to drive it higher. Hence, current flow through the load will remain constant. Thereafter, when the output of the control system falls below the limit set by the limit circuit, output line 68 will again track the input from the control system.

With regard to the minimum circuits 52(1)–52(N), the operational amplifier 62 of each circuit will have its noninverting input set to a predetermined voltage level that corresponds to the maximum current to be drawn through a single load. Assuming an active current source, i.e., one that is on or partially conducting, the operational amplifier 60 will fluctuate in response to the output of the comparator circuit 18. Thus, the voltage appearing on line 68 of a conducting current source will track the output of the comparator circuit (via the operational amplifier 60) to a predetermined maximum (i.e., the input to the operational amplifier 62). Once this predetermined maximum value is reached, line 68 will be held to the maximum voltage potential. Hence, current flow through the load will remain constant and the next current source in the series will begin to conduct.

As will be appreciated by those skilled in the art, the minimum circuit 52(0) be separately implemented in the control circuit of FIG. 1. And, the minimum circuits 52(1)–52(N) may be implemented without the use of minimum circuit 52(0). Utilization of the minimum circuit 52(0) is advantageous where the control system as a whole can only dissipate a maximum power level. The minimum circuits 52(0)–52(N) are advantageous for limiting the current through each load.

Although the present invention has been described with respect to its preferred embodiments, those skilled in the art will realize that changes may be made in form and scope without departing from the spirit of the invention. Therefore, the scope of the invention should be determined solely by reference to the following claims.

The embodiments of the invention in which an exclusive property or privilege is claimed one defined as follows:

1. Apparatus for controlling current through a plurality of loads using a single control line, comprising:
    a plurality of current control stages arranged in a sequence, each current control stage including a first terminal coupled to a different one of the loads, a second terminal, a third terminal, and means for conducting current between the first and second terminals in response to a level signal present at the third terminal, each current control stage being operable in response to its level signal in a first state in which it conducts a relatively low level of current, in a second state in which it conducts a predetermined level of current, and in a plurality of intermediate states between the first and second states in which the current control stage conducts current between said low and predetermined levels of current; and
    activation means, coupled to the third terminals of each current control stage, for producing the level signals in response to a control signal present on the single control line, the activation means producing level signals such that when one of the current control stages is conducting current in an intermediate state, all preceding current control stages in the sequence are in their second states and all subsequent current control stages in the sequence are in their first states.

2. The apparatus of claim 1 wherein the current control stages are substantially non-conducting when in their first states.

3. The apparatus of claim 2 wherein the current control stages are fully conducting when in their second states.

4. The apparatus of claim 3 wherein the intermediate states of each current control stage form a continuum in which the amount of current conducted varies monotonically with its respective level signal.

5. The apparatus of claim 4 wherein the amount of current conducted varies in a substantially linear manner as the level signal is varied.

6. The apparatus of claim 1 wherein the activation means includes a plurality of blocking circuits, a different one of the blocking circuits being positioned between the third terminals of pairs of the current control stages, the blocking circuits having a substantially nonconducting state and a conducting state, each blocking circuit being in a conducting state only when all preceding current control stages are conducting current at their respective second states; and a comparator circuit, responsive to the control signal and a feedback signal, for generating an output signal that is coupled to the third terminal of the first current control stage in the sequence, the control signal being a function of the desired level of current conducted by the current control stages, the feedback signal being indicative of the actual level of current being conducted by the current control stages and the output signal being a function of the voltage differential between the control and feedback signals.

7. The apparatus of claim 6 and further including a plurality of resistors, a different one of the resistors being coupled between the comparator circuit and the second terminals of each current control stage to thereby provide the feedback signal to the comparator circuit.

8. The apparatus of claim 6 wherein each current control stage includes a current probe positioned so as to sense the level of current being conducted by the current control stage.

9. The apparatus of claim 2 wherein each current control stage includes an operational amplifier, a pass transistor, a current sense resistor and a feedback resistor, the operational amplifier having an inverting input terminal, a noninverting input terminal coupled to receive the respective current control stage's level signal, and an output terminal, the pass transistor having a control terminal, an input terminal corresponding to the first terminal of the current control stage and an output terminal, the current sense resistor being connected between the output terminal of the pass transistor and a reference potential, the feedback resistor being connected between the inverting input of the operational amplifier and the output terminal of the pass transistor, each current control stage further including means for coupling the output of the operational amplifier to the control terminal of the pass transistor.

10. The apparatus of claim 9 wherein the pass transistor is a field-effect transistor.

11. The apparatus of claim 9 wherein the means for coupling comprises a drive transistor, the drive transistor having a control terminal, an input terminal and an output terminal, the control terminal of the drive transistor being connected to the output terminal of the operational amplifier and the output terminal of the drive transistor being coupled to the control terminal of the pass transistor to drive the pass transistor in response to an output signal generated by the operational amplifier.

12. The apparatus of claim 11 wherein the drive and pass transistors are bipolar transistors.

13. The apparatus of claim 9 wherein each blocking circuit comprises a diode.

14. The apparatus of claim 1 and further including a minimum circuit coupled between the single control line and the activation means, the minimum circuit establishing a maximum level of current to be conducted through the current control stages.

15. The apparatus of claim 14 wherein the minimum circuit is responsive to the control signal on the single control line and a limit signal, the apparatus further including a limit circuit for generating the limit signal such that the limit signal is representative of a maximum level of current to be conducted through the current control stages.

16. The apparatus of claim 15 wherein the minimum circuit includes (a) first and second operational amplifier responsive to the control and limit signals, respectively, each operational amplifier having an inverting input terminal, a noninverting input terminal, and an output terminal, (b) means, responsive to the greater of the control and limit signals, for blocking the output of the first and second operational amplifiers, and (c) first and second feedback resistors, coupled between the means for blocking and the inverting inputs of the first and second operational amplifiers, respectively.

17. The apparatus of claim 16 wherein the means for blocking includes first and second diodes, each having an anode and a cathode, the cathodes of the first and second diodes connected to the output terminals of the first and second operational amplifiers, respectively, and the anodes of each diode coupled to each other and to the first and second feedback resistors.

18. The apparatus of claim 1 and further including a plurality of minimum circuits, one of the minimum circuits being coupled between the activation means and each of the current control stages, the minimum circuit establishing a maximum level of current to be conducted individually by each current control stage.

19. The apparatus of claim 18 wherein each minimum circuit is responsive to the level signal present at each respective current control stage and a limit signal, the apparatus further including a limit circuit for generating the limit signal such that the limit signal is representative of the maximum level of current to be conducted by each current control stage.

20. The apparatus of claim 19 wherein each minimum circuit includes (a) first and second operational amplifiers responsive to the level and limit signals, respectively, each operational amplifiers responsive to the level and limit signals, respectively, each operational amplifier having an inverting input terminal, a noninverting input terminal, and an output terminal, (b) means, responsive to the greater of the level and limit signals, for blocking the output of the first and second operational amplifiers, and (c) first and second feedback resistors, coupled between the means for blocking and the inverting inputs of the first and second operational amplifiers, respectively.

21. The apparatus of claim 20 wherein the means for blocking includes first and second diodes, each having an anode and a cathode, the cathodes of the first and second diodes connected to the output terminals of the first and second operational amplifiers, respectively, and the anodes of each diode coupled to each other and to the first and second feedback resistors.

* * * * *

UNITED STATES PATENT AND TRADEMARK OFFICE
CERTIFICATE OF CORRECTION

PATENT NO. : 5,208,485
DATED : May 4, 1993
INVENTOR(S) : J. A. Krinsky et al.

It is certified that error appears in the above-identified patent and that said Letters Patent is hereby corrected as shown below:

| COLUMN | LINE | |
|---|---|---|
| 1 | 18 | "included" should read --include-- |
| 2 | 67 | delete "of" (second occurrence) |
| 9 | 37 | "moved" should read --removed-- |
| 10 | 4 | "52(O)" should read --52(0)-- |
| 10 | 18 | "52(O)" should read --52(0)-- |
| 10 | 66 | "$D_1$-$D_{-1}$" should read --$D_1$-$D_{N-1}$-- |
| 12 | 12 | after "52(0)" insert --need not be used in conjunction with the minimum circuits 52(1)-52(N), and may-- |
| 12 | 18 | "52(0)-52(N)" should read --52(1)-52(N)-- |
| 14 (Claim 20 | 49 & 50 Lines 49/50) | delete "amplifiers responsive to the level and limit signals, respectively, each operational" |

Signed and Sealed this

First Day of February, 1994

*Attest:*

BRUCE LEHMAN

*Attesting Officer*    *Commissioner of Patents and Trademarks*